April 15, 1947.                W. A. HAUGSTED                2,418,835
                                BLOWER CONTROL
              Filed Aug. 22, 1944                 3 Sheets-Sheet 1
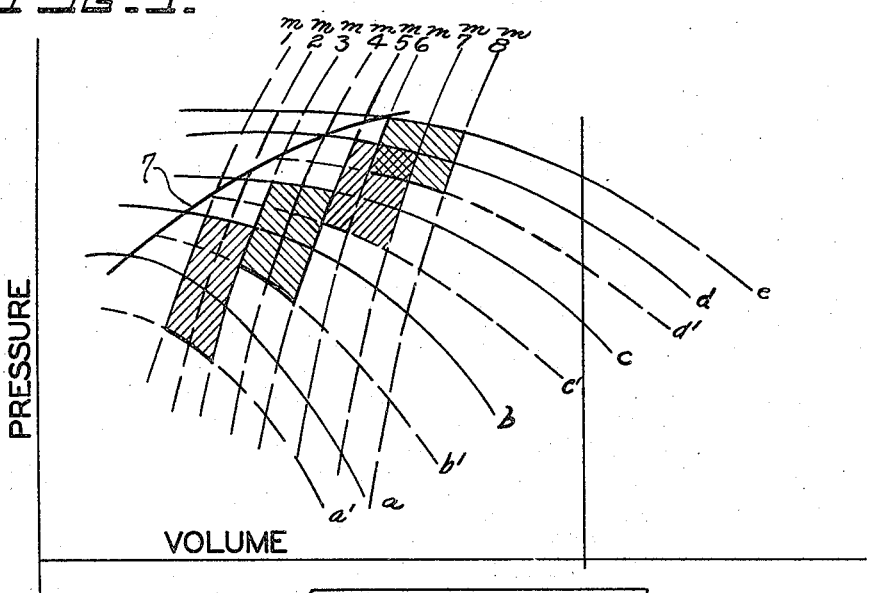
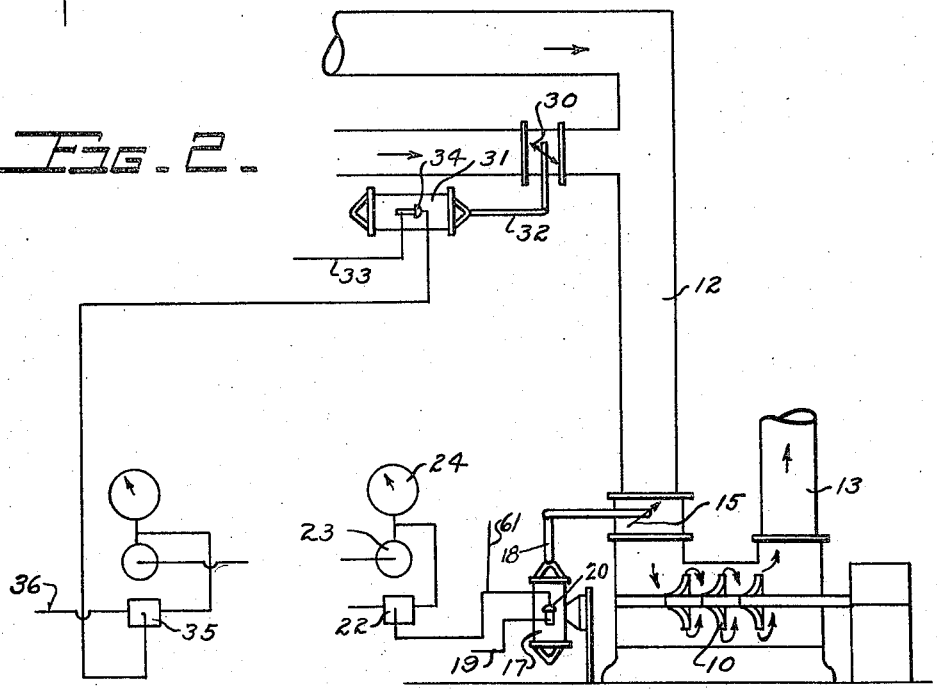
INVENTOR:
William A. Haugsted

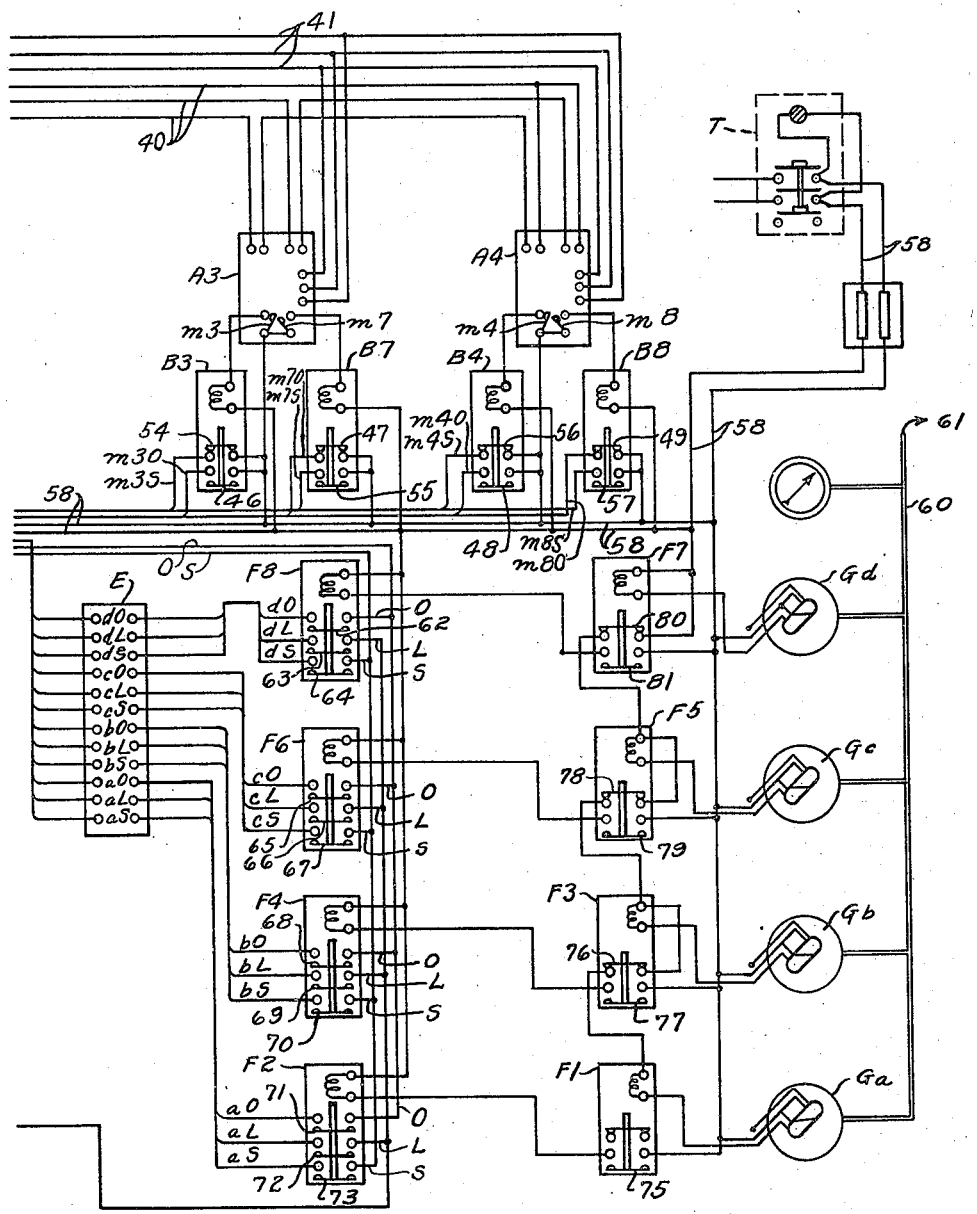

Patented Apr. 15, 1947

2,418,835

UNITED STATES PATENT OFFICE 2,418,835

BLOWER CONTROL

William A. Haugsted, Dayton, Ohio

Application August 22, 1944, Serial No. 550,653

8 Claims. (Cl. 230—115)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to controls for centrifugal compressors or exhausters.

In the following specification reference will be made to the accompanying drawings in which:

Fig. 1 is a typical pressure-volume curve for a centrifugal compressor or exhauster having thereon isodynamic lines showing the power consumed by the machine.

Fig. 2 is a typical layout for a centrifugal compressor or exhauster system in connection with which the present invention is used.

Fig. 3b is a continuation of Fig. 3a showing the remainder of the instruments and wiring.

Figure 3A:
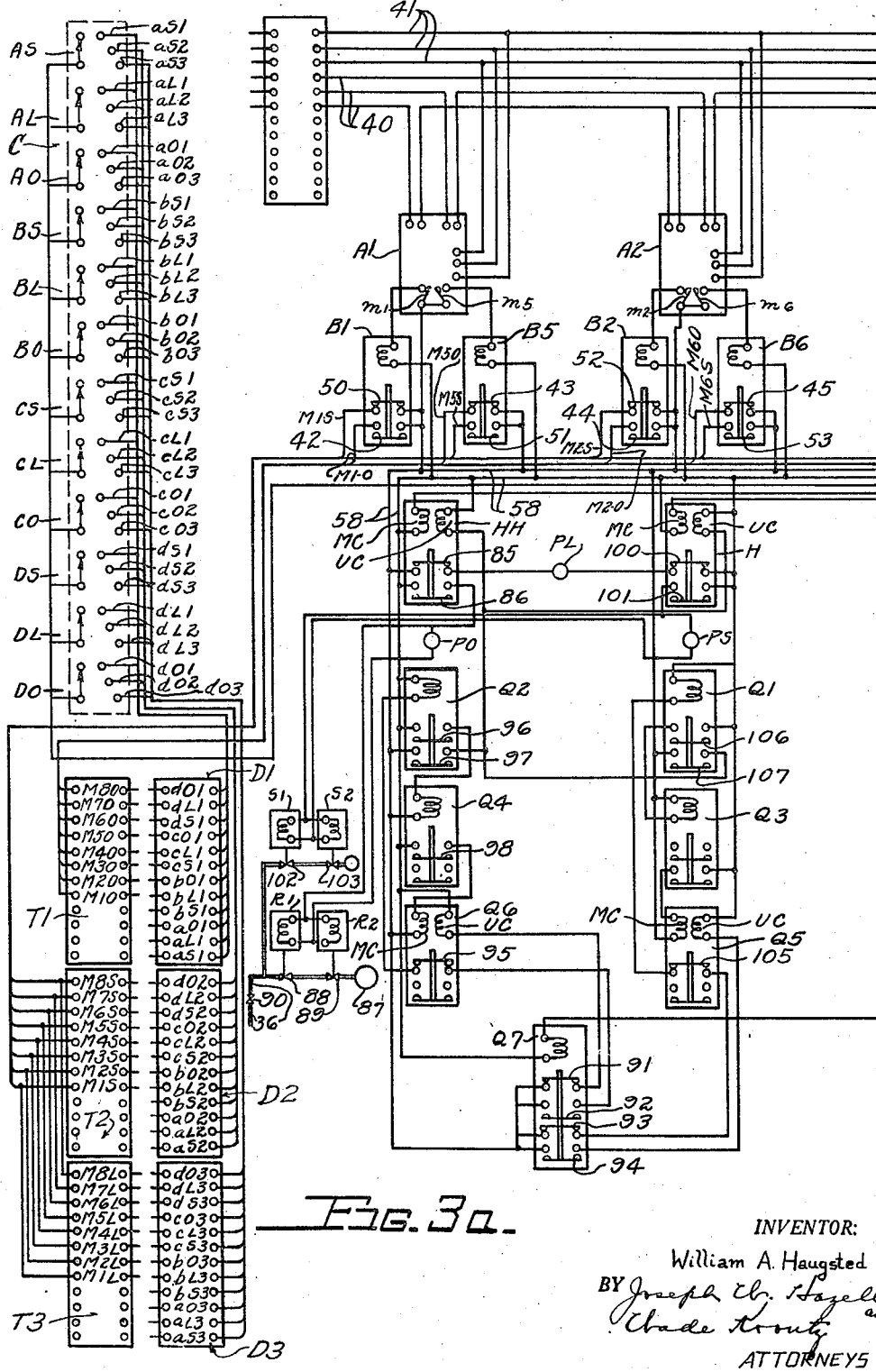
Fig. 3a is an instrument and wiring diagram of a portion of a centrifugal compressor or exhauster control embodying the present invention.

Reference will be made hereinafter to the term "blower," and it will be understood that that term is generic and applies equally to a centrifugal compressor or to a centrifugal exhauster.

In regulating blowers, it is customary to provide a valve 15 to regulate the supply of air to the blower. If desired the valve 15 may be replaced with adjustable guide vanes which serve the same purpose.

For each position of the valve 15 or guide vanes, there is definite pressure-volume characteristic curve. Such a set of curves is shown in Fig. 1, in which the curves $a$, $b$, $c$, $d$ and $e$ represent successively greater openings of the valve 15, the curve $e$ representing the fully open position of the inlet valve.

If at any time insufficient air is available to the blower for any given opening of the valve 15, a serious vibration of the machine will occur. Such a vibration due to lack of air passing through the machine is known throughout the industry as "pumping." The points at which such pumping occurs for various openings of the valve 15 define what is known as the natural pumping curve, shown on Fig. 1 at 7.

Whenever the operation of the machine approaches the natural pumping curve 7, it is necessary to permit additional air to pass through the blower. This air is usually supplied by a bleed valve leading into the pumping line. In the case of an exhauster, such a valve is located on the inlet side of the machine so as to let more air into the system which passes through the blower. In the case of a compressor, however, the inlet side of the machine is open to the atmosphere, in which case the bleed valve must be placed on the exhaust side of the machine so that a portion of the air pumped into the machine will bleed out through the bleed valve into the atmosphere thus permitting more air to go into the machine and eliminating pumping.

One object of the present invention is to provide a centrifugal blower system which will operate constantly beyond the pumping curve.

Another object is to provide a blower system which will reduce fluctuations in the quantity of air delivered.

A further object of the invention is to provide a blower system which will operate constantly at near maximum efficiency.

A still further object of the invention is to provide a blower system in which the fluctuations of the bleed valve are reduced to a minimum.

A still further object is to provide a blower system in which the quantity of air bled into the blower will remain substantially constant through a limited range.

A still further object is to provide a blower system in which the bleed valve remains in fixed position over a predetermined range of pressure.

A still further object is to provide a blower system in which the bleed valve remains in a fixed position over a predetermined range of delivery volume.

A still further object is to provide a blower system in which the bleed valve remains in fixed position over a predetermined range of pressure and volume.

A still further object is to provide a blower system which will automatically start bleeding air as the conditions of the operation of the blower approach the natural pumping curve.

A still further object is to provide a blower system in which the bleed valve is automatically reset to a different fixed position when either limit of a predetermined range of volume is reached.

A still further object is to provide a blower system in which the bleed valve is automatically reset to a different fixed position when either limit of a predetermined range of pressure is reached.

Further objects will become apparent upon considering the following specification, which taken in connection with the accompanying drawings illustrate one form of the invention.

In its broad aspect the invention comprises a bleed valve placed in the inlet of a centrifugal exhauster or in the outlet of a centrifugal compressor with means to open the bleed valve at a predetermined point on the pump characteristic curve to permit additional air to pass through the machine.

Referring to Fig. 2 there is shown a diagrammatic view of a blower assembly including a portion of the controls. The blower 10, actuated by a constant speed motor 11, has an inlet pipe 12 and an exhaust pipe 13 which together form a conduit for the passage of air from a source through the blower. The inlet pipe 12 has a valve 15 or adjustable guide vanes comparable to a valve located in the blower inlet to regulate the flow of air to the blower. The valve or guide vanes 15 may be adjusted through a pneumatic cylinder 17 which contains a piston (not shown) which operates a piston rod 18. The piston rod 18 moves upwardly to adjust the position of the guide vanes or valve 15. The cylinder 17 is maintained under air pressure through pipeline 19. The position of the piston in the cylinder is governed by air pressure on a diaphragm 20 which is supplied from a variable pressure source through a transfer valve 22. Pressure in the transfer valve 22 may be regulated by a handwheel 23 and the pressure indicated on an indicator 24.

If desired a static pressure indicator (not shown) may be placed in the inlet pipe 12 (or the exhaust pipe 13 in the case of a compressor) and the pressure within the pipe 12 or 13 used with an actuator at valve 22 to automatically set the valve 15 to the desired position. Setting the valve 15 to any definite position will cause the blower 10 to operate on a characteristic curve such as shown at $a$, $b$, $c$, $d$, Fig. 1, each setting of the valve 15 giving a separate characteristic curve. As the volume of air passing into the blower is decreased and the machine approaches the natural pumping curve 7, it is necessary to supply additional air to the blower in order to avoid pumping or vibration. In the case of the exhauster shown in Fig. 2, this is done by a bleed valve 30 which leads into the inlet pipe of the blower. The setting of the valve 30 is governed by a pneumatic cylinder 31 which contains a piston (not shown) having a piston rod 32, the movement of which actuates the valve. The control of the air to the diaphragm 34 is effected through a pipeline 36 and transfer valve 35 by means of the apparatus shown in Figs. 3a and 3b, to be described below.

Referring again to Fig. 1, it will be noted that the characteristic curves $a$ to $e$, inclusive, as well as the natural pumping curve 7, are crossed by a plurality of curves $m1$ to $m8$, inclusive. Each of the curves $m1$ to $m8$ are isodynamic lines or lines of equal power for various operating conditions of the machine, the curve $m1$ representing the smaller amount of power and increasing to a value of $m8$.

In order to reduce the fluctuations and increase the general efficiency the system disclosed, the present invention contemplates gradually opening the bleed valve when the volume being pumped diminishes to a point where the machine is operating close to the natural pumping curve, and continuing to open the bleed valve until the machine is operating at a point far enough away from the natural pumping curve as to preclude fluttering of the valve between open and shut positions. At this point, the bleed valve is locked in fixed position and thereafter bleeds a substantially fixed amount of air into the system.

If the machine should continue after the bleed valve is locked to move away from the natural pumping curve a point may be selected at which the bleed valve begins to shut, such a point being designated the "shut" position of the valve. When the shut position of the bleed valve is reached, the bleed valve is gradually closed until the operation of the machine again passes the locked position at which point the bleed valve is again locked in fixed position and bleeds a substantially constant amount of air into the system until such time as the operation of the machine reaches the open position of the valve or the shut position.

By way of example, and to simplify an explanation of the apparatus shown in Figs. 3a and 3b, points may be chosen on one or more curves of the diagram Fig. 1 in which the bleed valve will open, lock and shut. On the curve $a$, for example, it might be desirable to open the bleed valve when the power consumed drops to the value $m1$, lock the bleed valve in fixed position when the value of power consumed reaches the value $m2$ and start shutting the bleed valve when the value of power increases to $m3$.

Referring to Figs. 3a and 3b, which show the apparatus used to regulate the bleed valve in the manner outlined above, it will be seen that the power for the system is supplied from two sources, the first is a three-phase power system used to operate the blower 10, having potential leads 41 and current leads 40 which are connected to a plurality of watt-meters A1 to A4 in a manner such as to indicate the power consumed by the blower 10. A second source of power is from a pair of power lines 58 controlled by a switch T, the power from lines 58 being used to actuate the various apparatus other than the blower 10 and watt meters A1 to A4.

The watt meters A1 to A4 each have a minimum and a maximum switch thereon, the minimum switches being labeled $m1$ to $m4$, which are adapted to open upon an increase in power above that for which the switch is set, the maximum switches being labeled $m5$ to $m8$, inclusive, and are adapted to close upon the increase in power above that for which they are set. The switches $m1$ to $m8$ are set for powers corresponding to the isodynamic lines $m1$ to $m8$ of Fig. 1. The switches $m1$ to $m8$, inclusive, control the action of relays B1 to B8, respectively, the power for the relays being obtained from the line 58. The relays B1 to B8 each has two contact switches, one of which opens upon energization of the relay and one of which closes upon energization of the relay.

The relays B1 to B8 have switches thereon numbered 42 to 49, inclusive, which control circuits M10 to M80 and 50 to 57 which control circuits M1S to M8S. The circuits M10 to M80 are each closed when the switches $m1$ to $m8$, respectively, are actuated due to a decrease in power, while the circuits M1S to M8S are each closed when the switches $m1$ to $m8$, respectively, are actuated due to an increase in power. The circuits M10 to M80 are connected to terminal board T—1 while the circuits M1S to M8S are connected to both terminal boards T—2 and T—3.

Three terminal boards D1, D2 and D3 are located adjacent the boards T1, T2 and T3 to provide for three different operating conditions of the machine, with a gang switch C being used to select the particular condition under which it is desired to have the machine operate. In the example given above, (column 4, lines 14 to 24). If it is desired to open the bleed valve for a value of power $m1$ on curve $a$, M10 on board T1 would be connected by an electrical jumper to the terminal $aO1$ on board $D1$. Similarly, the terminal M2L on board T3 would be connected by jumper to the terminal $aL1$ on board $D1$ and the terminal M3S on board T2 would be connected by jumper to $aS1$ on $D1$. Similar connections are made from the operating points selected on the other characteristic curbes $b$, $c$ and $d$ between the boards T1, T2 and T3 and the board $D1$.

Lines leading from the terminal boards $D1$, $D2$ and $D3$ lead to a gang switch C thence to a terminal board E. The gang switch C selects which board $D1$, $D2$ or $D3$ it is desired to use. From the terminal board E the connections run to a plurality of relays F8, F6, F4 and F2. The relay F8 is intended to control the three positions, namely, open, locked and shut in the range of the $d$ curve and has thereon three switches 62, 63 and 64 to control respectively the open, locked and shut positions. The relay F6 controls the open, locked and shut positions for the range of the curve $c$ and for that purpose has switches 65, 66 and 67. The relay F4 controls the open, locked and shut positions for the range of the curve $b$ and has for that purpose switches 68, 69, 70. The relay F2 controls open, lock and shut positions for the range of the curve $a$ for which purpose it has switches 71, 72 and 73.

Relays F8, F6, F4 and F2 are controlled by pressure switches $Gd$, $Gc$, $Gb$ and $Ga$, respectively, through relays F7, F5, F3 and F1. The switches $Gd$, $Gc$, $Gb$ and $Ga$ are arranged to close when pressures on the diaphragm 20 raise to or exceeds the pressure necessary to give the characteristic curves $d$, $c$, $b$ and $a$, respectively. When the pressure on the diaphragm 20 raises to a point sufficient to give the characteristic curve $a$ the pressure switch $Ga$ energizes the relay F1. Energization of the relay F1 completes the circuit through a switch 75 on the relay F1, actuating the relay F2 and closing switches 71, 72 and 73. When the pressure on the diaphragm 20 raises to a pressure sufficient to give a characterized curve $b$ the pressure switch $Gb$ operates to energize the relay F3. Energization of the relay F3 opens the switch 76 and closes the switch 77. Opening the switch 76 breaks the circuit to the relay F1 while closing the switch 77 energizes the relay F4. De-energizing relay F1 opens the switch 75 and de-energizes the relay F2 breaking the contacts between the lines $ao$, $al$, $as$ and the line $o$, $l$ and $s$. Energization of the relay F4 completes the circuit across the switches 68, 69, 70.

When the pressure on the diaphragm 20 reaches the value which gives characterized curve $c$ the pressure switch $Gc$ is actuated to energize the relay F5 which simultaneously opens a switch 78 and closes a switch 79. Opening the switch 78 breaks the circuit through the relay F3 de-energizing relay F4 opening switches 68, 69 and 70 while closing the switch 79 energizes relay F6, closing the switches 65, 66, 67.

When the pressure on the diaphragm 20 reaches a point necessary to give the characterized curve $d$ the switch $Gd$ operates to complete the circuit through the relay F7 and simultaneously opens a switch 80 and closes a switch 81. Opening the switch 80 breaks the circuit to relay F5 de-energizing relay F6 to open switches 65, 66, 67, and closing the switch 81 completes the circuit through the relay F8 to close the switches 62, 63 and 64.

The switches $Ga$, $Gb$, $Gc$ and $Gd$ are mercury snap switches and are set to close the circuits therethrough at the characteristic curves $a$, $b$, $c$ and $d$, respectively, on Fig. 1 and to hold the circuit closed until the pressure has dropped to the values $a'$, $b'$, $c'$, and $d'$ respectively.

In the example chosen above, it was desired to open the bleed valve on the curve $a$ when the value of power reached $m1$. The connection was therefore made on the board T1 between the terminal M10 by jumper to $aO1$ on board $D1$, and between M2L on board T3 and $aL1$ on board $D1$ and between M3S on T2 and $aS1$ on board $D1$. When the machine is started, and until the power builds up to the value $m1$, the switch $m1$ on the wattmeter A1 is closed, maintaining the relay B1 energized and sending the current to the line M10 on board T1 and $aO1$ on the board $D1$ and to the terminal $aO$ on the terminal board E, and to the terminal $aO$ on the relay F2.

As the machine is then operating on the curve $a$ by reason of the setting of the valve 15, the current will be closed across the switch $Ga$, energizing a relay F1, completing the current across the switch 75 and energizing the relay F2. Energization of the relay F2 completes the circuit between $aO$ and $O$, which energizes a main coil MC of a relay HH locking the relay in energized position. Energization of the relay HH breaks the circuit to a switch 85 to extinguish a pilot light PL and simultaneously makes the circuit through switch 86 to light pilot light PO and to open a pair of solenoid valves R1 and R2. Opening the valves R1 and R2 starts air flowing from a pressure pipe 87 through valves 88, 89 through a needle valve 90, into the supply pipe 36 and to the diaphragm 34, Fig. 2. As the pressure builds up on the diaphragm 34 through the continued opening of the valves 88 and 89, the bleed valve 30 continues to open, permitting more air to pass into the intake of the blower, which causes the machine to operate further away from the natural pumping curve 7.

When the pressure-volume relationship builds up to a point where the power consumed is equal to $m2$, the switch $m2$ opens, de-energizing the relay B2 closing the circuit across the switch 52 and energizing the line M2L on the board T3, and $aL1$ on $D1$, since the latter two are connected by jumper. Current passes from $aL1$ on board $D1$ through the gang switch C to terminal $aL$ on board E and terminal $aL$ on relay F2. Since the machine is operating on the curve $a$, the relay F2 is energized and the current passes into line L which energizes the relay Q7. Relay Q7 has four switch contact members 91, 92, 93 and 94, switches 92 and 94 closing upon energization, and switches 91 and 93 closing upon de-energization of relay Q7. Upon energization of the relay Q7, current passes from the line 58 through the switch 92 through a switch 95 on a relay Q6 to energize a relay Q2. Energization of the relay Q2 closes the circuits through switches 96 and 97 on that relay. Closing the switch 97 sends current from the line 58 through the unlock coil UC of the relay HH and through the unlock coil of relay H, de-energizing the relays H and HH and breaking the contact across the switches 86 and 101. Breaking the contact across the switch 86 closes the valves R1 and R2, and extinguishes pilot light PO while breaking the current across switch 101 closes valves S1 and S2 and extinguishes pilot light PS. The bleed valve 30 is thus locked in substantially fixed position in which a set amount of air passes therethrough.

Closing a switch 96, energizes the relay Q4, which closes a switch 98. Closing of the switch 98 completes the circuit through the main coil MC of relay Q6, locking it in energized position and breaking the circuit across switch 95, de-energizing the relays Q2, Q4 and Q6. The relay Q4 is necessary in the circuit to insure the operation of the unlock coil UC of the relay HH before the current is broken across the switch 95.

If the machine continues after locking the bleed valve 30 in fixed position to move away from the natural pumping curve 7 due to external causes, power will build up until its value equals m3, at which point the switch m3 on the wattmeter A3 opens, dropping the relay B3 and closing the switch 54, completing the circuit to the line M3S on the terminal board T2, to the terminal aS1 on the terminal board D1, through the gang switch C to the terminal dS on terminal board E and on relay F2. Since the machine is still operating on curve a, the relay F2 will be energized, closing the circuit across switch 73, which energizes the main coil MC of relay H, locking that relay in energized position. Energizing the relay H simultaneously opens a switch 100, extinguishing the pilot light PL if that light is lit and closing the switch 101. Closing the switch 101 energizes a pair of solenoid valves S1 and S2, opening valves 102 and 103, permitting the air to bleed out from the diaphragm 34 through the needle valve 90 past the valves 102 and 103 to the atmosphere, thus causing the bleed valve 30 to shut gradually. Simultaneously, closing the switch 101 lights the pilot light PS indicating that the bleed valve is shutting.

When the value of the current again drops to a value of m2, the switch m2 will close, opening the switch 52 and cutting off the current to M2L on board T3, which cuts off the current through contact aL on relay F2 and to the relay Q7, closing the switches 91 and 93 on the relay Q7. De-energization of the relay Q7 sends the current from the line 58 through the switch 93 through a switch 105 on a relay Q5 and energizes a relay Q1, closing a pair of switches 106 and 107. Closing the switch 107 completes a circuit through the unlock coil UC of both relays H and HH unlocking those relays and de-energizing the solenoids R1, R2, S1 and S2, and closing valves 88, 89, 102 and 103. Closing the valves 88 and 89 and the valves 102 and 103, holds the bleed valves 30 in fixed position and permits constant bleeding of air into the machine.

*Operation*

The points at which it is desired to open, lock and shut the bleed valve are determined either from characteristic curves such as are shown in Fig. 1, or by experiment, and the values of power at which each such change is to be made is set on the corresponding switches m1 to m8. Electrical jumpers are then connected between the terminal board T1 from the point at which it is desired to open the bleed valve on curve a and the terminal aO1 on board D1 and similarly, between the points on the board T1 at which it is desired to open the valve on the curves b, c and d and the corresponding terminals bO1, cO1 and dO1 on the board D1.

Electrical jumpers are also connected between the terminal points M1S to M8S on the board T2 at which it is desired to start shutting the valve 30 and corresponding points aS1, bS1, cS1 and dS1 on the board D1.

Similarly, jumpers connect the points M1L to M8L on the board T3 at which it is desired to effect locking of the bleed valve in fixed position on each curve to the corresponding points aL1, bL1, cL1 and dL1 on the terminal board D1.

The blower is started with the valve 15 in shut position and the valve maintained shut till the blower has attained substantially full operating speed. After the blower has attained full speed, the valve 15 is set to cause the blower to operate on any desired characteristic curve. If the setting of the bleed valve 15 is such as to cause the machine to operate above the characteristic curve a, the pressure from the line 61 will actuate the pressure switch Ga, energizing the relay F1 and closing the switch 75, thus energizing the relay F2. Energization of the relay F2 closes switches 71, 72 and 73. Until the power being used by the blower exceeds that at which it is desired to open the bleed valve 30, the terminal aO is connected to the power line 58 through the switch 42 and hence, when the power falls below that point or, until it builds up to exceed it, with the blower operating between curves a and b, power will be transmitted across the switch 71, sending current into the line O which energizes the main coil MC of relay HH and locks it in energized position. It will be noted that whereas the switch Ga closes to complete the circuit across the switches 71, 72 and 73 at a pressure a (Fig. 1), that it retains control until the operation of the machine decreases to a point at which it is operating on curve a' (Fig. 1).

Energizing the relay HH closes the switch 86 and energizes the solenoid valves R1 and R2, causing the valves 88 and 89 to open and permit air from the pressure source 87 to flow past the needle valve 90 and gradually open the bleed valve 30.

When the current builds up to the point where it is desired to lock the bleed valve, the line aL becomes energized, through switch 52 sending current through the line L to energize the relay Q7. Energization of the relay Q7 closes the switch 94, unlocking the relay Q5 and simultaneously closes the switch 92, sending current across the switch 95 of relay Q5, to energize the relay Q2.

Energization of relay Q2 permits current to flow across the switch 97, which sends a current to the unlock coil UC of the relay HH and to the unlock coil UC to the relay H. De-energization of the relay HH closes the valves 88 and 89, preventing further opening of the bleed valve while de-energization of the relay H closes the valves 102—103, preventing any closing of the bleed valve 30. The bleed valve is thus locked in fixed position and bleeds a substantially set amount of air into the machine. Energization of the relay Q2 likewise closes the switch 96 which energizes the relay Q4, closing switch 98, energizing the main coil MC, the relay Q6, locking that relay in energized position and breaking the circuit to Q2.

De-energization of the relay Q2 breaks the circuit across the switch 97 and cuts off currents to the coils UC of relays H and HH. Should the power build up due to changes in the operating conditions in the machine to the point at which it is desired to start shutting the valve 15, the circuit aS is energized, which transmits current across the switch 73, energizing the circuit S, which sends current to the main coil MC of the relay H, energizing that relay and closing the switch 101. Closing the switch 101 energizes the solenoid valves S1 and S2, opening the valves 102 and 103, permitting air to drain from the diaphragm 34 through the needle valve 90 and escape through the valves 102—103 to the atmosphere thus gradually closing the bleed valve 15.

As the bleed valve is gradually closed the power consumed decreases until it again passes the lock point on the operation curve, at which point the line aL becomes de-energized through opening switch 52, de-energizing the relay Q7 and completing the circuit across switches 91 and 93. Completion of the circuit across the switch 91 sends a current through the unlock coil UC of relay Q6, de-energizing the relay and completing a circuit across the switch 95. Completion of the circuit through the switch 93 sends a current through the switch 105, which is now closed and energizes the relay Q1. Energization of the relay Q1 completes the circuit through a switch 107 to unlock the coils UC of both relays HH and H, de-energizing those relays and closing the solenoid valves R1 and R2 and S1 and S2 to again lock the bleed valve in fixed position.

It will be noted that the bleed valve 30 is locked in fixed position when in the process of either opening or shutting, and the operation moves across the lock point.

Pilot lights PO, PL and PS are placed in the circuits between the relays H and HH and the valves R1, R2, and S1, S2 to indicate whether the bleed valve 30 is opening (PO) shutting (PS) or locked (PL).

If the valve 15 is moved to a position where the machine is operating on curve $b$, the pressure switch Gb then cuts in, breaking the circuit through the switch 76 to the relay F1.

When the circuit through the switch 76 is broken due to the closing of switch Gb when the pressure reaches or exceeds curve $b$, the relay F1 drops, opening the switch 75 and breaking the circuit to the relay F2, disconnecting switches 71, 72 and 73.

Energization of the relay F3 also closes switch 77, actuating the relay F4 to close switches 68, 69 and 70. Since the switches 71, 72 and 73 are cut out upon energization of the relay F3 and switches 68, 69 and 70 are cut in, second set of predetermined points at which it is desired to operate the valves R1, R2, S1 and S2 on the curve $b$ will assume control to energize or de-energize the lines O, L or S. The circuits O, L and S actuate the relays H and HH, controlling the valves R1, R2 and S1, S2, respectively, in the same manner as set forth for curve $a$.

When the power builds up sufficiently to cause the machine to operate on or above the characteristic curve $c$, the current is completed from the switch Gc to the relay F5, breaking the circuit through the switch 78 to both the relays F1 and F3 at the same time completing a circuit to the switch 79 to energize the relays F6, closing switches 65, 66 and 67. Breaking the circuit to the relay F3 opens the switch 77 and breaks the circuit to the relay F4, opening the switches 68, 69 and 70. When this condition exists, a third set of predetermined points chosen to operate the open, shut and lock positions of the valve 30 on the curve $c$ control energization or de-energization of the circuits cO, cL and cS across the switches 65, 66 and 67 to energize the circuits O, L and S and operate the relays HH and H, controlling the valves R1 and R2 and S1 and S2 as described above.

Similarly, when the setting of the valve 15 is such as to cause the blower to operate on or above the characteristic curve $d$, current is completed to the switch Gd, energizing the relay F7, breaking the circuit to the relays F5, F3 and F1, and making the circuit to the relay F8. Breaking the circuit to the relay F5 de-energizes the relay F6, opening the circuit switches 65, 66 and 67. Under these conditions, a fourth set of points chosen to operate the opening, locking and shutting of the valve 30 for the curve $d$ actuate the relays HH and H across closed switches 62, 63 and 64 in the same manner as described for curve $a$, to control the valves R1 and R2 and S1 and S2.

The pressure switches Ga, Gb, Gc and Gd are designed to close at one pressure, and open at a lower pressure. Thus the switch Ga is adapted to control the operation of the machine between the curve $a'$ and $b$; the switch Gb is adapted to control the operation between the curve $b'$ and $c$; the switch Gc is adapted to control the operation of the machine between the curve $c'$ and $d$; and the switch Gd is adapted to control the operation from the curve $d'$ to the maximum curve $e$. Thus when the bleed valve is locked, it remains in fixed position over a given range of pressures and over a given range of volume and may be said to remain constant over a given area on the pressure-volume curve, such typical areas being shown shaded in Fig. 1.

It is obvious that the blower herein can be made to operate on any intermediate curve between curve $a$ and the curve $e$, (Fig. 1), as well as exactly on the curves $a$, $b$, $c$ and $d$. For increasing pressures, the pressure switch Ga assumes control of the operation as the pressure reaches curve $a$ and retains control until the pressure either increases to curve $b$ or decreases to curve $a'$. Pressure switch Gb assumes control at curve $b$ and retains the control until the pressure either increases to characteristic curve $c$ or decreases to curve $b'$. The pressure switch Gc assumes control at $c$ and retains control until the pressure either increases to curve $d$ or decreases to the curve $c'$, and the pressure switch Gd assumes the control of the machine at the curve $d$ and retains it for all greater pressures or until the pressure decreases to curve $d'$. In reducing the pressures, the pressure switch $d$ will retain control until the pressure decreases to the characteristic curve $d'$ at which point control is transferred to Gc. The pressure switch Gc retains control until the pressure decreases to the curve $c'$ at which point control is transferred to Gb. The pressure switch Gb retains control until the pressure decreases to curve $b'$ at which point control is transferred to Ga and the pressure switch Ga retains control between the curves $b'$ and $a'$. The machine is not operated below curve $a'$.

The shaded areas of Fig. 1 show a complete typical layout at which it may be desired to effect changes in bleed valve position. Until the power consumed by the machine reaches the valve of $m1$, Fig. 1, and with the valve 15 opened, so that the machine is operating between the curves $a$ and $b$, the bleed valve will be open and will start shutting when the power reaches the value of $m3$. As the valve 15 is opened, the point $m1$ continues to retain control of the opening of the bleed valve 30 until the characteristic curve $b$ is reached. At this point, pressure switch Gb cuts in and the control of the bleed valve is switched from power value $m1$ to power value $m3$. Since the switch Gb cuts in on the curve $b$ and cuts out on the curve $b'$, raising the pressure or lowering it on either side of the line $b$, fails to throw control back to the switch Ga until pressure $b'$ is reached, thus preventing fluttering of the bleed valve.

Having thus described the invention, it will be realized that it is susceptible to various changes

What is claimed as new and desired to secure by Letters Patent is:

1. A blower having an inlet pipe an exhaust pipe, said pipes forming a conduit, an inlet valve in said conduit, variation of said inlet valve being adapted to vary the pressure-volume characteristic curve of said blower, said blower having a point on each characteristic curve at which pumping occurs, and a bleed valve in said conduit adapted, upon opening, to cause additional air to pass through said blower, in combination with a regulator for said blower, said regulator comprising means to gradually open said bleed valve as the operation of the blower approaches the natural pumping curve, means to gradually shut the bleed valve when the operation of the blower has moved away from the pumping curve to a definite amount, means to lock the bleed valve in fixed position as the operation of the blower passes a point intermediate that at which the bleed valve starts to open and that at which it starts to shut, and means to vary the points at which the bleed valve is actuated as the inlet valve is varied.

2. In a device of the character described, a centrifugal blower an intake pipe connected with said blower, an exhaust pipe connected with said blower, said pipes forming a conduit, an adjustable control valve in said conduit, a motor connected with said blower to actuate the same, a bleed valve opening into said conduit and adapted, upon opening, to cause more air to pass through said blower, means actuated by a drop in power being consumed by the motor below a predetermined minimum to start opening said bleed valve at a predetermined control valve setting, means actuated by an increase of power above a predetermined maximum to start shutting said bleed valve, and means actuated by either a drop in power or an increase in power to lock said bleed valve in fixed position at a predetermined point between the opening and shutting positions.

3. In a stable operating pumping system, a blower, power means for driving the blower, means for varying the inlet flow to the blower to vary the pressure-volume operating characteristic curve thereof, the blower having a point on each characteristic curve at which pumping occurs, a bleed valve for admitting additional air to the blower, servo mechanism adapted when energized to move the bleed valve in the opening and closing directions respectively and when deenergized to leave the bleed valve locked in adjusted position, control means for the servo mechanism including means operative upon the operating characteristic of the blower approaching the pumping curve to energize the servo mechanism to cause opening of the bleed valve, means operative upon the blower operating characteristics moving away a predetermined amount from the pumping curve to energize the servo mechanism to cause closing of the bleed valve, the operating points of said control means being spaced apart such that the zone between the operating points on the pressure-volume curves is an appreciable portion of the operating range of the blower and means operable upon the operating characteristics of the blower reaching a median point between the limits of said zone to deenergize the servo mechanism to lock the bleed valve in adjusted position until either of the operating points for the servo mechanism is again reached due to variation in blower load and means responsive to predetermined changes in the blower load as the inlet flow is varied to vary the operating points at which the bleed valve is actuated.

4. An automatic step bleed control for a centrifugal blower to ensure stable operation thereof, comprising in combination with the blower and power driving means therefor, a bleed valve for admitting additional air to the blower, servo mechanism for actuating said bleed valve in the opening and closing direction, selective control means for said servo mechanism adapted when energized to cause actuation of said servo mechanism and when deenergized to lock said servo mechanism in adjusted position, and means responsive to variation in input power between predetermined limits operatively connected to said control means for energizing the same, said last named means including means operative upon diminution or increase of input power beyond said predetermined limits to energize said control means to cause the servo mechanism to adjust the bleed valve respectively in the opening and closing direction to vary the blower load such that the input power approaches a median value between said predetermined power limits, and means operable in response to the input power attaining said median value to deenergize said servo mechanism control means to thereby leave said bleed valve locked in a fixed adjusted position.

5. An automatic blower control system comprising in combination with the blower, a driving motor for the blower, means for varying the inlet flow of the blower to vary the operating pressure-volume characteristic curve, said blower having a point on each characteristic curve at which unstable operation or pumping occurs, a servomotor actuated bleed valve for admitting additional air to the blower to prevent pumping, said servo being of a type when selectively energized will move said bleed valve in the opening and closing directions respectively and when deenergized will leave the bleed valve locked in adjusted position, and control means for said servomotor including a control element movable in accordance with variation in output power of the blower driving motor, a plurality of control devices operatively connected to said servomotor and engaged seriatim by said control element upon predetermined increments of change in output power of said blower driving motor, said control devices being operative in groups of three to control said servo motor, a first of the devices in each said group being operative upon a predetermined value of power to energize said servomotor to move the bleed valve in the opening direction, a second of the devices in each group being operative at a predetermined increment of power to energize the servomotor to move the bleed valve in the closing direction and the third device of each group being operative upon the said motor output power attaining a value intermediate the operative power value of the first and second devices to deenergize the servomotor to thereby leave the bleed valve locked in adjusted position.

6. The structure as claimed in claim 5, including selector means responsive to output pressure of the blower for rendering said control devices groups sequentially operative to control the servomotor as the blower load is varied by predetermined increments.

7. The structure as claimed in claim 5 in which selector means are provided for rendering said control device groups sequentially and severally operative to control the bleed valve servomotor, said selector means being operative in response to predetermined changes in the operating characteristic of the blower to respectively energize said control device groups and said control device groups being so arranged that their respective points of operation occur in overlapping zones in the pressure-volume operating range of the blower as determined by the setting of the means for varying the inlet flow to the blower.

8. In a stable operating pumping system, a blower, power means for driving the blower, means for varying the inlet flow to the blower to vary the blower load, a bleed valve for admitting additional air to the blower to eliminate unstable operation thereof, servomechanism for actuating said bleed valve in the opening and closing operation, said servomechanism including means responsive to a decrease in blower load below a predetermined minimum for causing a continuous opening of said bleed valve, means responsive to an increase of blower load beyond a predetermined maximum for causing a continuous closing of said bleed valve, and means responsive to blower load attaining a predetermined value intermediate said predetermined limiting values for deenergizing said servomechanism and locking said bleed valve in an adjusted position irrespective of the direction of actuation of said bleed valve.

WILLIAM A. HAUGSTED.

REFERENCES CITED

The following references are of record in the file of this patent:

UNITED STATES PATENTS

| Number | Name | Date |
| --- | --- | --- |
| 1,241,372 | Guyer | Sept. 25, 1917 |
| 1,097,298 | Callan | May 19, 1914 |
| 1,280,811 | Moss | Oct. 8, 1918 |
| 1,281,216 | Schellens | Oct. 8, 1918 |
| 1,325,255 | Loewenstein | Dec. 16, 1919 |
| 1,783,036 | Crawford | Nov. 25, 1930 |
| 2,000,721 | Standerwick | May 7, 1935 |